United States Patent
McCready et al.

(10) Patent No.: US 8,875,146 B2
(45) Date of Patent: Oct. 28, 2014

(54) SYSTEMS AND METHODS FOR BOUNDING PROCESSING TIMES ON MULTIPLE PROCESSING UNITS

(75) Inventors: Arthur Kirk McCready, Glendale, AZ (US); Aaron R. Larson, Shoreview, MN (US); Ryan Lawrence Roffelsen, Tigard, OR (US); Larry James Miller, Black Canyon City, AZ (US); Murali Rangarajan, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 13/195,503

(22) Filed: Aug. 1, 2011

(65) Prior Publication Data

US 2013/0036423 A1 Feb. 7, 2013

(51) Int. Cl.
 G06F 9/46 (2006.01)
 G06F 9/50 (2006.01)
 G06F 9/48 (2006.01)

(52) U.S. Cl.
 CPC ............ *G06F 9/4881* (2013.01); *G06F 9/5066* (2013.01)
 USPC .......................................... 718/103; 718/104

(58) Field of Classification Search
 CPC ............................ G06F 9/4881; G06F 9/5066
 USPC .................................................. 718/103, 104
 See application file for complete search history.

(56) References Cited

U.S. PATENT DOCUMENTS

| | | | |
|---|---|---|---|
| 5,745,778 A | 4/1998 | Alfieri | |
| 6,438,553 B1 * | 8/2002 | Yamada | ................................. 1/1 |
| 6,560,628 B1 | 5/2003 | Murata | |
| 6,754,690 B2 | 6/2004 | Larson | |
| 6,964,048 B1 | 11/2005 | Isham | |
| 7,107,590 B2 | 9/2006 | Bril et al. | |
| 7,140,022 B2 | 11/2006 | Binns | |

(Continued)

FOREIGN PATENT DOCUMENTS

| | | |
|---|---|---|
| WO | 02054238 | 7/2002 |
| WO | 2006004826 | 1/2006 |

(Continued)

OTHER PUBLICATIONS

Easwaran et al., "Systems and Methods for Task Grouping on Multi-Processors", filed U.S. Appl. No. 13/367,042, Feb. 6, 2012, pp. 1-38.

(Continued)

*Primary Examiner* — Camquy Truong
(74) *Attorney, Agent, or Firm* — Fogg & Powers LLC

(57) ABSTRACT

Embodiments of the present invention provide improved systems and methods for processing multiple tasks. In one embodiment a method comprises: selecting a processing unit as a master processing unit from a processing cluster comprising multiple processing units, the master processing unit selected to execute master instruction entities; reading a master instruction entity from memory; scheduling the master instruction entity to execute on the master processing unit; identifying an execution group containing the master instruction entity, the execution group defining a set of related entities; when the execution group contains at least one slave instruction entity, scheduling the at least one slave instruction entity to execute on a processing unit other than the master processing unit during the execution of the master instruction entity; and terminating execution of instruction entities related by the execution group when a master instruction entity is executed that is not a member of the execution group.

18 Claims, 5 Drawing Sheets

(56) References Cited

U.S. PATENT DOCUMENTS

| | | | |
|---|---|---|---|
| 7,165,252 B1 | 1/2007 | Xu | |
| 7,222,218 B2 | 5/2007 | Dutt et al. | |
| 7,302,685 B2 | 11/2007 | Binns | |
| 7,444,638 B1 | 10/2008 | Xu | |
| 7,472,389 B2 | 12/2008 | Smith | |
| 7,681,014 B2 | 3/2010 | Jensen et al. | |
| 7,788,673 B2 | 8/2010 | Bibby | |
| 7,827,551 B2 | 11/2010 | Kulbak | |
| 7,840,966 B2 | 11/2010 | Dodge | |
| 7,844,952 B2 | 11/2010 | Barsness et al. | |
| 7,873,507 B2 | 1/2011 | Tatsuoka | |
| 7,908,604 B2 | 3/2011 | Takayama | |
| 8,074,222 B2 * | 12/2011 | Hirai | 718/102 |
| 8,527,971 B2 | 9/2013 | Helovuo | |
| 8,607,236 B2 * | 12/2013 | Kawano et al. | 718/102 |
| 2001/0023434 A1 * | 9/2001 | Viollet et al. | 709/208 |
| 2001/0054055 A1 | 12/2001 | Bollella | |
| 2002/0120661 A1 | 8/2002 | Binns | |
| 2003/0069917 A1 | 4/2003 | Miller | |
| 2003/0088606 A1 | 5/2003 | Miller | |
| 2003/0154234 A1 | 8/2003 | Larson | |
| 2006/0085582 A1 * | 4/2006 | Shikano et al. | 710/260 |
| 2006/0107264 A1 | 5/2006 | Schmidt et al. | |
| 2006/0136915 A1 | 6/2006 | Aingaran | |
| 2006/0206887 A1 | 9/2006 | Dodge et al. | |
| 2007/0204268 A1 | 8/2007 | Drepper | |
| 2007/0294384 A1 * | 12/2007 | Nakajima et al. | 709/223 |
| 2009/0031317 A1 | 1/2009 | Gopalan et al. | |
| 2009/0158297 A1 | 6/2009 | Lee | |
| 2009/0217280 A1 | 8/2009 | Miller | |
| 2009/0307700 A1 | 12/2009 | Cazorla Almeida | |
| 2010/0088706 A1 | 4/2010 | Dong et al. | |
| 2010/0131955 A1 | 5/2010 | Brent et al. | |
| 2010/0199280 A1 | 8/2010 | Vestal | |
| 2010/0268912 A1 | 10/2010 | Conte et al. | |
| 2010/0333098 A1 | 12/2010 | Jordan et al. | |
| 2011/0067029 A1 | 3/2011 | Wolfe et al. | |
| 2013/0036421 A1 | 2/2013 | Miller et al. | |
| 2013/0205301 A1 | 8/2013 | Easwaran et al. | |
| 2014/0122848 A1 | 5/2014 | Easwaran et al. | |

FOREIGN PATENT DOCUMENTS

| | | |
|---|---|---|
| WO | 2009007169 | 1/2009 |
| WO | 2010001353 | 1/2010 |
| WO | 2012005637 | 1/2012 |

OTHER PUBLICATIONS

Easwaran et al., "Systems and Methods for Instruction Entity Allocation and Scheduling on Multi-Processors", filed U.S. Appl. No. 13/665,294, Oct. 31, 2012, pp. 1-66.
Bini, "A Hyperbolic Bound for the Rate Monotonic Algorithm", "Proceedings of the 13th Euromicro Conference on Real-Time Systems", Jun. 2001, pp. 1-14, Published in: Delft, The Netherlands.
Bini, "Schedulability Analysis of Periodic Fixed Priority Systems", "IEEE Transactions on Computers ", Nov. 2004, pp. 1-12, vol. 53, No. 11.
Kato, "A Fixed-Priority Scheduling Algorithm for Multiprocessor Real-Time Systems", "Parallel and Distributed Computing", Jan. 2010, pp. 143-158.
Lehoczky, "The Rate Monotonic Scheduling Algorithm: Exact Characterization and Average Case Behavior", Dec. 7, 1989, pp. 166-171, Publisher: IEEE.
Liu, "Scheduling Algorithms for Multiprogramming in a Hard-Real-Time Environment", "Journal of the Association for Computing Machinery", Jan. 1973, pp. 46-61, vol. 20, No. 1, Published in: US.
"Why multi core processors?", "accessed Feb. 6, 2012", Jun. 13, 2010, pp. 1-3, Publisher:superuser.com/questions/152011/why-multi-core-processors.
Ramya, "Window Constrained Scheduling of Processes in Real Time CPU Using Multi Objective Genetic Algorithm", "International Journal of Computer Applications (0975-8887) ", Feb. 2010, pp. 86-90, vol. 1, No. 21.
Srinivasan, "The Case for Fair Multiprocessor Scheduling", Nov. 2002, pp. 1-18, Publisher: Department of Computer Science University of North Carolina.
Binns, "A Robust High-Performance Time Partitioning Algorithm: The Digital Engine Operating System (DEOS) Approach", Oct. 18, 2001, pp. 1-12, Publisher: IEEE.
Miller et al., "Constrained Rate Monotonic Analysis and Scheduling", U.S. Appl. No. 13/195,529, filed Aug. 1, 2011, 56 pages.
Paolieri, "Hardware Support for WCET Analysis of Hard Real-Time Multicore Systems", "ISCA '09", Jun. 20-Jun. 24, 2009, pp. 1-12, Publisher: ACM.
Yamada, "Proposal and Evaluation of Apis for Utilizing Inter-Core Time Aggregation Scheduler", "Presented at the 15th Workshop on Job Scheduling Strategies for Parallel Processing (cs.huji.ac.il/~feit/parsched/jsspp10/p11-yamada.pdf)", Apr. 23, 2010, pp. 1-18.
Yamada, "Proposal and Evaluation of Apis for Utilizing Inter-Core Time Aggregation Scheduler", Oct. 9, 2010, pp. 191-207, vol. 6253, Publisher: Springer-Verlag Berlin Heidelberg.
Yan, "WCET Analysis for Multi-Core Processors With Shared L2 Instruction Caches", "IEEE Real-Time and Embedded Technology and Applications Symposium", Apr. 22, 2008, pp. 80-89, Publisher: IEEE.
European Patent Office, "Office Action", from Foreign Counterpart of U.S. Appl. No. 13/195,503, Feb. 5, 2013, pp. 1-6, Published in: EP.
European Patent Office, "European Search Report", from Foreign Counterpart of U.S. Appl. No. 13/195,503, Jan. 24, 2013, pp. 1-4, Published in: EP.
Feitelson et al., "Distributed Hierarchical Control for Parallel Processing", May 1990, pp. 65-78.
U.S. Patent and Trademark Office, "Office Action", from U.S. Appl. No. 13/367,042, Aug. 16, 2013, pp. 1-42, Published in: US.
U.S. Patent and Trademark Office, "Final Office Action", from U.S. Appl. No. 13/367,042, Dec. 20, 2013, pp. 1-50, Published in: US.
European Patent Office, "European Offie Action from EP Application No. 12177868.2 mailed Jul. 21, 2014", "from Foreign Counterpart of U.S. Appl. No. 13/195,503", Jul. 21, 2014, pp. 1-5.
European Patent Office, "Office Action from EP Application No. 13152396.1 mailed May 20, 2014", "from Foreign Counterpart of U.S. Appl. No. 13/367,042", May 20, 2014, pp. 1-8, Published in: EP.
European Patent Office, "European Search Report from EP Application No. 13152396.1 mailed Apr. 25, 2014", "from Foriegn Counterpart of U.S. Appl. No. 13/367,042", Apr. 25, 2014, pp. 1-3, Published in: EP.
U.S. Patent and Trademark Office, "Advisory Action ", "from U.S. Appl. No. 13/367,042", Apr. 10, 2014, pp. 1-3, Published in: US.
U.S. Patent and Trademark Office, "Office Action", "from U.S. Appl. No. 13/367,042", Jun. 20, 2014, pp. 1-19, Published in: US.
European Patent Office, "Office Action from EP Application No. 13187196.4 mailed Jul. 3, 2014", "from Foreign Counterpart of U.S. Appl. No. 13/665,294", Jul. 3, 2014, pp. 1-14, Published in: EP.
European Patent Office, "European Search Report from EP Application No. 13187196.4 mailed Jun. 13, 2014", "from Foreign Counterpart of U.S. Appl. No. 13/665,294", Jun. 13, 2014, pp. 1-4, Published in: EP.
Kopetz, "Real-Time Systems: Design Principles for Distributed Embedded Applications Second Edition", 2011, pp. 1-387, Publisher: Springer Science + Business Media, LLC.
Nemati et al., "Multiprocessor Synchronization and Hierarchical Scheduling", "International Conference on Parallel Processing Workshops", Sep. 22, 2009, pp. 58-64, Published in: SE.
Sprunt et al, "Aperiodic Task Scheduling for Hard-Real-Time Systems", "The Journal of Real-Time Systems", Jun. 1989, pp. 27-60.
Thomadakis, "Efficient Scheduling of Firm Aperiodic Tasks in Fixed-Priority, Hard Real-Time Systems", Mar. 2, 2011, pp. 1-28.

* cited by examiner

SYSTEMS AND METHODS FOR BOUNDING PROCESSING TIMES ON MULTIPLE PROCESSING UNITS

BACKGROUND

Multi-core processors are able to process different computational tasks simultaneously. As such, multi-core processors can perform more computations in a given period of time as compared to single core processors. During the processing of different computation threads, the different cores on multi-core processors share resources such as on-chip communication buses, memory controllers, cache, I/O devices, and the like. At times, tasks executing on different cores interfere with one another due to the shared resources. These resource conflicts, which arise during processing, can increase the time used to execute a particular task. When the multi-core processor is implemented in a safety-critical real time system, the worst case processing time of the executing tasks must be known for the different tasks that execute on each processor. The degree of cross-core interference due to shared resources makes it difficult to measure and bound the effects of resource conflicts between executing tasks. The challenge of measuring and bounding the effects of the resource conflicts inhibits safety-critical real time systems from taking advantage of the performance benefits presented by multi-core processors.

For the reasons stated above and for other reasons stated below which will become apparent to those skilled in the art upon reading and understanding the specification, there is a need in the art for improved systems and methods for controlling the cross-core interference due to shared resources.

SUMMARY

The Embodiments of the present invention provide methods and systems for scheduling tasks on multiple processing units and will be understood by reading and studying the following specification.

Embodiments of the present invention provide improved systems and methods for processing multiple tasks. In one embodiment, a system comprises: a processing cluster that includes a plurality of processing units; at least one memory device coupled to the processing cluster, the at least one memory device storing a plurality of instruction entities; a scheduling means configured to schedule a set of one or more instruction entities belonging to an execution group on the processing cluster, the execution group comprising a set of instruction entities from the plurality of instruction entities; wherein a first unit of the plurality of processing units is designated by the scheduling means as a master processing unit and at least one of the set of one or more instruction entities is designated as a master instruction entity for execution on the master processing unit; wherein the master processing unit executes the at least one master instruction entity; wherein when the execution group contains one or more slave instruction entities, the scheduling means schedules execution of said one or more slave instruction entities on at least one processing unit of the processing cluster other than the first unit; and wherein the scheduling means terminates execution of the set of one or more instruction entities when a master instruction entity is executed on the processing cluster that is not a member of the execution group.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for utilizing multiple processing units, such as cores within a multi-core processor, hyperthreads within a hyperthreaded CPU or core, and CPUs within a system with multiple CPUs. This is accomplished by designating one of the processing units as a master processing unit and designating one or more other processing units as slave processing units. Tasks are grouped into "execution groups". Execution groups contain one or more tasks assigned to the master processing unit and tasks assigned to one or more slave processing units. A scheduler allots processing time to each task that executes on the master processing unit. The scheduler also schedules the other tasks within the execution group to execute on the slave processing units during the time when tasks of the execution group executing on the master processing unit are active. When a scheduling event causes a task swap on the master processing unit, if the newly scheduled task is part of a different execution group, the scheduler stops the processing of the tasks executing on slave processing units and schedules tasks on the slave processing units that are associated with the new execution group.

This scheduling scheme allows for the bounding of interference patterns between tasks, which also allows for the determination of worst case interference times. Also, by designating that the scheduler of the master processing unit has priority for entering the critical section during scheduling of tasks, the amount of overhead associated with critical section entry is greatly reduced from being the number of processing units multiplied by the longest duration of time of a critical section used by a scheduler to being solely the longest duration of time of a critical section used by a scheduler. The order of the process for entering the critical section being reduced from O(n) to O(1). Further, the use of execution groups allows for the implementation of beneficial cache interaction and greater scheduling flexibility.

Figure 1:
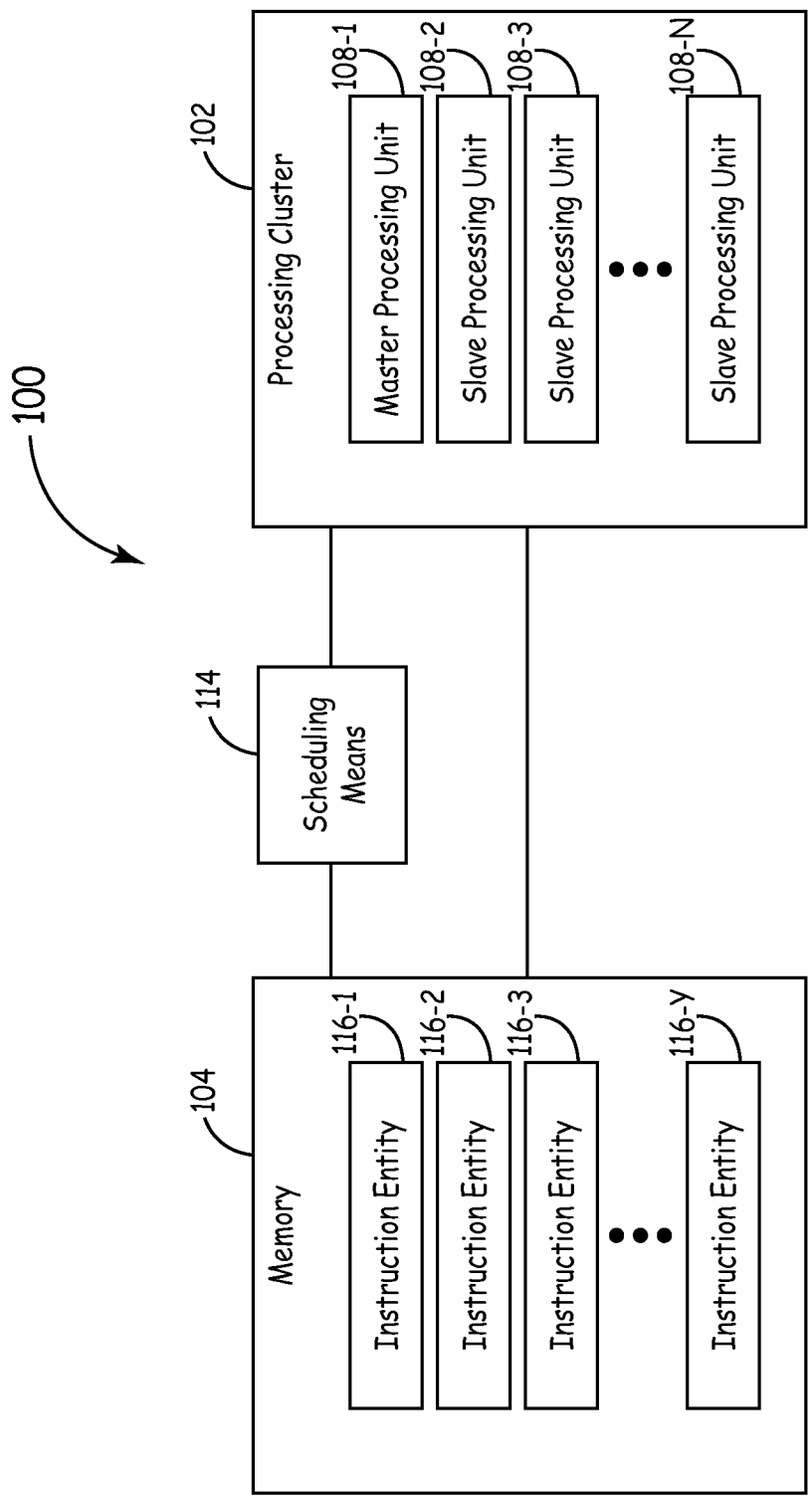
FIG. 1 is a block diagram illustrating a system for bounding processing times according to one embodiment of the present invention.

FIG. 1 is a block diagram illustrating a system 100 for scheduling the processing of instruction entities on multiple processing units. System 100 includes at least one processing cluster 102 and a memory 104. Cluster 102 includes multiple processing units 108-1-108-N, where a processing unit is a computational device capable of accepting data and performing mathematical and logical operations as instructed by computer readable instructions. Examples of a processing cluster include a set of CPUs in a multi-CPU system, a set of cores in a multi-core CPU, or a set of hyperthreads within a hyperthreaded processing unit. In an alternative implementation, a system of multiple processing units includes multiple processing clusters. For example, a multi-core CPU with four cores contains two processing clusters, each processing cluster having two processing units. The instructions that direct the performance of the processing units 108-1-108-N are stored on a computer or machine readable medium used for storage of instructions or data structures, such as memory 104, which is coupled to cluster 102.

Memory 104 stores multiple instruction entities in a physical machine readable medium device. An instruction entity is an entity containing one or more threads of instruction code to be executed by the cluster 102. For example, in one embodiment, an instruction entity includes code for executing an application. In another embodiment, an instruction entity defines a portion of memory within memory 104 that stores instruction code.

System 100 includes a scheduling means 114, which schedules the execution of each instruction entity 116-1-116-Y executed by cluster 102. In one embodiment, scheduling means 114 is a scheduler in an operating system that dynamically schedules the execution of instruction entities 116-1-116-Y. In another embodiment, scheduling means 114 schedules the execution of instruction entities 116-1-116-Y according to a static time definition. For example, when the operating system is ARINC 653, where each instruction entity 116-1-116-Y has a dedicated time slot. Further, scheduling means 114 can schedule all the processing units 108-1-108-2 in cluster 102, scheduling means 114 includes an individual scheduler for each processing unit 108-1-108-2, or scheduling means 114 includes a set of schedulers capable of scheduling a set of processing units 108-1-108-2 in cluster 102.

Scheduling means 114 determines which processing unit 108-1-108-N in cluster 102 will execute a particular instruction entity 116-1-116-Y. To determine when instruction entities 116-1-116-Y execute on cluster 102, scheduling means 114 follows a scheduling algorithm that provides rules and methods for determining how to schedule the processing of instruction entities 116-1-116-Y. Scheduling means 114 follows scheduling algorithms such as rate monotonic, priority preemptive, round robin, ARINC 653, and the like. In another implementation, scheduling means 114 uses multiple scheduling algorithms for scheduling instruction entities 116-1-116-Y on the different processing units within cluster 102. For example, scheduling means 114 uses a first scheduling algorithm on processing unit 108-1 and a second scheduling algorithm on processing unit 108-2.

In certain embodiments, the scheduling means 114 is a scheduler in a time partitioned operating system. For example, scheduling means 114 schedules instruction entities 116-1-116-Y by allotting a processing budget to an instruction entity. When scheduling means 114 allots a processing budget to the instruction entity. The processing budget is consumed by the execution of the instruction entity on a processing unit in cluster 102. Further, the execution of the instruction entity is either continuous or non-continuous. For example, when the execution is continuous, the execution of the instruction entity is continuous and uninterrupted until the allotted processing budget is consumed. Alternatively, when the execution of the instruction entity is non-continuous, the execution of the instruction entity is broken up into smaller periods of time with other instruction entities executing between the smaller periods of time, where the sum of the smaller period of times equals the time allotted through the processing budget.

To control cross interference, promote beneficial interaction, and manage critical section overhead the instruction entities 116-1-116-Y are divided into execution groups. As the term is used herein, an execution group is a sub-set of instruction entities 116-1 to 116-Y that are related to one another for execution on cluster 102 during the processing of at least one master instruction entity. An execution group can be determined dynamically by a scheduler by adding or removing instruction entities from the execution group or be defined in a static definition of execution groups.

One or more of the instruction entities within an execution group are designated as master instruction entities with the balance being designated as slave instruction entities. Scheduling means 114 schedules the execution of master instruction entities and then schedules instruction entities that belong to the same execution group as the master instruction entities. The processing duration of the slave entities are constrained by the period in which the master instruction entity executes. To implement the execution of instruction entities organized into execution groups, scheduling means 114 designates one processing unit in cluster 102 as a master processing unit 108-1 while the other processing units in cluster 102 act as slave processing units 108-2-108-N. Further, scheduling means schedules the master instruction entities for execution on master processing unit 108-1 and the slave instruction entities for execution on slave processing units 108-2-108-N. The scheduling of instruction entities within an execution group is described in further detail below.

When scheduling means 114 schedules the execution of the master instruction entities on master prosecuting unit 108-1, scheduling means 114 determines whether there are any slave instruction entities that are part of the same execution group as the master instruction entities. When there are slave instruction entities, scheduling means 114 schedules a set of the slave entities to execute on the slave processing units 108-2-108-N within the processing budget allotted to the processing of the master instruction entity on master processing unit 108-1. The slave instruction entities that execute on slave processing units 108-2-108-N are scheduled to execute during the execution of the scheduled master instruction entities in the execution group on the master processing unit 108-1. When scheduling means 114 schedules the execution of a master instruction entity from a different execution group, scheduling means 114 reschedules the instruction entities executing on slave processing unit 108-2-108-N to slave instruction entities belonging to the new execution group.

In some implementations, the processing units 108-1-108-N in cluster 102 are controlled by different operating systems. Each operating system has a different scheduler that functions as the scheduling means 114 for its respective processing unit. In some implementations, the different schedulers use the same scheduling algorithm when scheduling instruction entities. Alternatively, the schedulers use different scheduling algorithms when scheduling instruction entities on cluster 102. For example, a first scheduler associated with a first operating system follows a first scheduling algorithm, while a second scheduler associated with a second operating system follows a second scheduling algorithm.

When different operating systems execute on each processing unit 108-1-108-N, the scheduler of one operating system is dedicated to scheduling master instruction entities on master processing unit 108-1. When the master scheduler schedules master instruction entities from an execution group, the master scheduler notifies the schedulers controlling the slave processing units 108-2-108-N that a master instruction entity belonging to a different execution group has been scheduled. The slave schedulers then schedule the slave instruction entities that are within the execution group of the master instruction entity. The slave instruction entities execute on slave units 108-2-108-N when a master instruction entity from the same execution group executes on master unit 108-1.

In some implementations that use a time partitioned operating system, when a slave instruction entity requires that the master instruction entities use the full processing budget allotted by scheduling means 114, scheduling means 114 ensures that a slave entity has the opportunity to execute during the full time allowed by the allotted processing budget by preventing the master instruction entities from finishing execution before the entire processing budget is consumed. For example, scheduling means 114 allots a processing budget to instruction entity 116-1 for processing on master processing unit 108-1. Scheduling means 114 assigns instruction entity 116-2 to execute on slave processing unit 108-2 during the processing budget of instruction entity 116-1. When instruction entity 116-2 requires the full amount of available processing time for execution, scheduling means 114 prevents the execution of instruction entity 116-1 from finishing before the allotted processing budget is fully consumed.

Alternatively, scheduling means 114 schedules the execution of instruction entities belonging to an execution group in a non-time partitioned operating system. In some implementations, scheduling means 114 schedules slave instruction entities to execute only during the execution of a master entity belonging to the same execution group. In an alternative embodiment, when scheduling means 114 schedules a slave instruction entity associated with an execution group, the execution of the slave instruction entity prevents scheduling means 114 from scheduling a new master instruction entity until the slave instruction entity finishes termination. Thus, the instruction entities in the execution group actively execute until each slave instruction entity finishes execution. In a further embodiment, the scheduling means defines a maximum time extension for the slave instruction entities. The maximum time extension defines a period of time appended to the end of the execution of the master instruction entity to provide more time for the execution of the slave entities. When the maximum time extension is reached, scheduling means 114 terminates the execution of the instruction entities in the execution group. The use of a maximum time extension prevents run-away threads from preventing scheduling means 114 from scheduling other instruction entities that belong to other execution groups.

In another implementation, processing units 108-1-108-N in cluster 102 include dedicated processors that are designed for certain applications. For example, processing units 108-1-108-N include digital signal processors (DSP), processing units that have faster access to memory 104, and the like. Scheduling means 114 assigns instruction entities in memory 104 to execute on processing units within cluster 102 to take advantage of the capabilities of the processing units 108-1-108-N and the affinities of the instruction entities for certain processing characteristics. For example, when instruction entity 116-2 is designed to execute on a DSP, scheduling means 114 assigns instruction entity 116-2 to be executed on a DSP.

Figure 2:
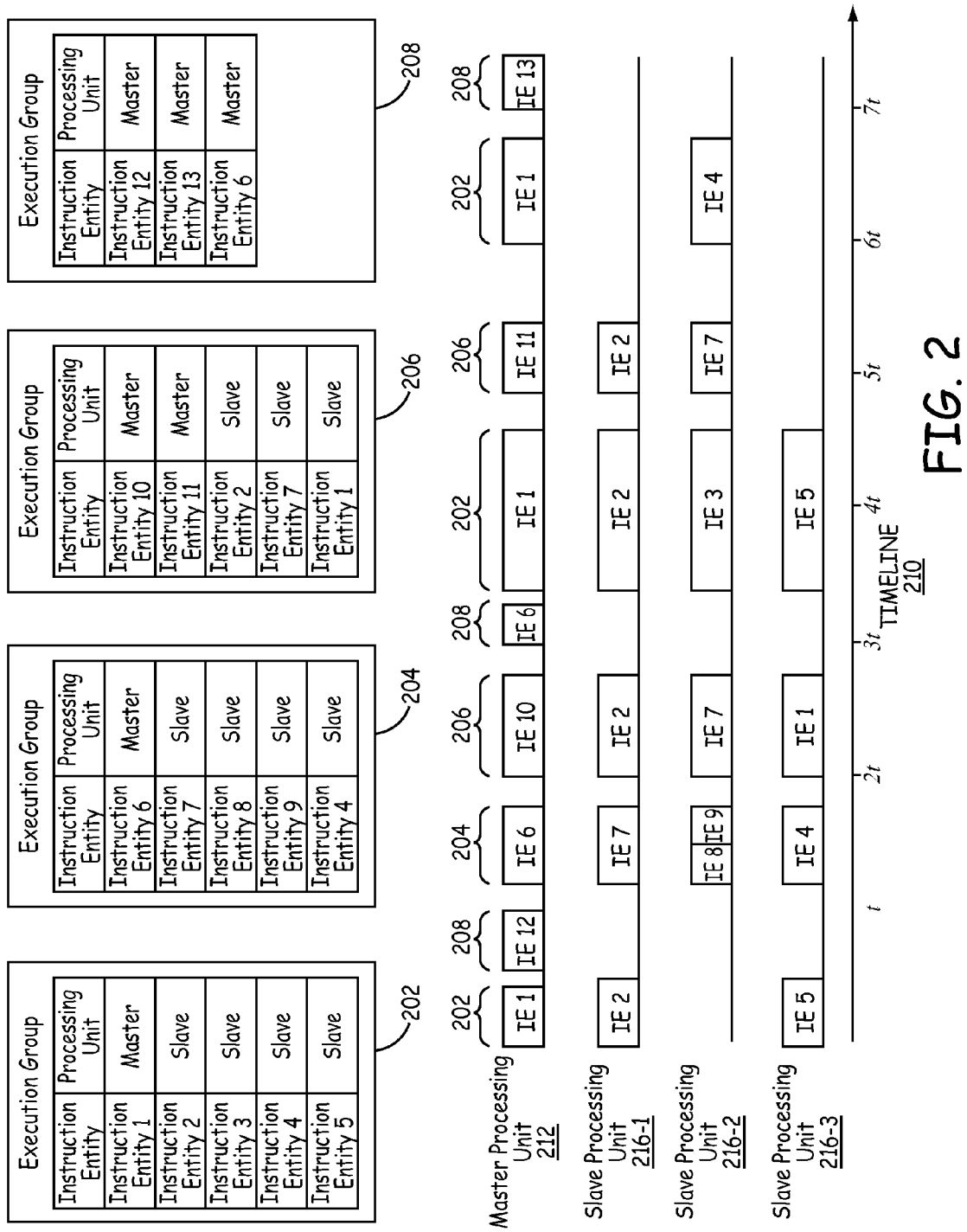
FIG. 2 is a block diagram illustrating execution groups and the scheduling of execution groups according to one embodiment of the present invention.

FIG. 2 is a block diagram illustrating multiple examples of execution groups with instruction entities (IE) to be scheduled on a processing cluster and the scheduling of the instruction entities on a processing cluster. Execution group 202 includes instruction entities 1-5. A scheduling means (such as 114 in FIG. 1) schedules instruction entity 1 to execute on the master processing unit As instruction entities 1-5 form an execution group, while instruction entity 1 executes on the master processing unit, scheduling means 114 schedules the execution of instruction entities 2-5 on the slave processing units.

As shown in the execution timeline 210, scheduling means 114 schedules instruction entity 1 (IE 1) to execute on master processing unit 212. In some implementations, as shown on execution timeline 210, the instruction entity 1 on mater processing unit 212 consumes 2.5 t of allotted time budget in non-contiguous sections of time. For example instruction entity 1 consumes the allotted time in three non-contiguous sections with durations of 0.5 t, 1.2 t, and 0.8 t. During the execution of instruction entity 1 on master processing unit 212, scheduling means 114 identifies the execution group associated with the instruction entity 1 and schedules the slave instruction entities of that execution group to execute on the slave processing units 216-1-216-3.

In some implementations, each processing unit executes one instruction entity during the budget allotted for the master instruction entity. For example, in group 202, while instruction entity 1 executes on the master processing unit, scheduling means 114 schedules instruction entity 2 to execute on slave processing unit 216-1 and instruction entity 5 to execute on slave processing unit 216-3 during the allotted budget for instruction entity 1. In an alternative implementation, multiple instruction entities execute on a single processing unit during the allotted budget for instruction entity 1. For example, scheduling means 114 schedules instruction entities 3 and 4 to execute on slave processing unit 2 during the allotted budget for instruction entity 1. Further, in some cases, scheduling means 114 will not schedule an instruction entity to execute on each slave processing unit 216-1-216-3. For example, on timeline 210, during the execution of instruction entity 1, the scheduling means lets slave processing unit 216-2 be inactive for a time period of 0.5 t.

When instruction entity 1 consumes the allotted budget on the master execution unit, all the instruction entities within group 202 that are executing on the processing cluster finish processing regardless of the processing state of the instruction entities on the processing units. When scheduling means 114 allots a processing budget to a different instruction entity for executing on master processing unit 212 that is associated with a different execution group, scheduling means 114 schedules instruction entities from the different execution group. For example, when scheduling means 114 schedules instruction entity 6 to execute on master processing unit 212, scheduling means 114 schedules instruction entities to execute that are in execution group 204 to execute on the slave processing units 216-1-216-3.

An instruction entity is not limited to being associated with a single execution group but can be associated with more than one execution group. For example, instruction entity 4 is associated with both execution group 202 and execution group 204. Therefore, scheduling means 114 is able to schedule the execution of instruction entity 4 when either instruction entity 1 or instruction entity 6 is executing on master processing unit 212. As shown in timeline 210, scheduling means 114 schedules instruction entity 4 to execute for 0.6 t on slave processing unit 216-3 in association with execution group 204 and 0.8 t on slave processing unit 216-2 in association with execution group 202.

In another implementation, a scheduling means schedules more than one instruction entity to execute on the master processing unit within an allotted processing budget. For example, two master instruction entities, 10 and 11, are associated with execution group 206. When either of the instruction entities 10 or 11 are executing on master processing unit 212, scheduling means 114 is able to schedule the execution of instruction entities 2, 7, and 1 on slave processing units 216-1-216-3. Further, scheduling means 114 is able to allot a processing budget to the instruction entities on slave processing units 216-1-216-3 that is less than or equal to the sum of the processing budgets allotted to the instruction entities within the execution group that execute on master processing unit 212. For example, scheduling means 114 allots a budget of 0.75 t to instruction entity 10 and a budget of 0.3 t to instruction entity 11 on master processing unit 212. Scheduling means 114 allots a budget to instruction entity 2 and 7 that is the sum of the budgets allotted to instruction entities 10 and 11, which is 1.05 t. Further, in some cases, an instruction entity that executes on the master processing unit in one execution group will execute on a slave processing unit in a different execution group. For example, instruction entity 1 executes on the master processing unit when instruction entity 1 is part of group 202 and executes on slave processing unit 3 when instruction entity 1 is part of group 206.

In at least one implementation, an execution group is only associated with instruction entities that execute on master processing unit 212. For example, in execution group 208, instruction entities 12, 13, and 6 all execute on master processing unit 212. There are no instruction entities that execute on the slave execution units. When all the instruction entities within an execution group execute on the same processing unit, the instruction entities are constrained to execute on the master processing unit and the processing cluster functions like a single core processor.

Figure 3:
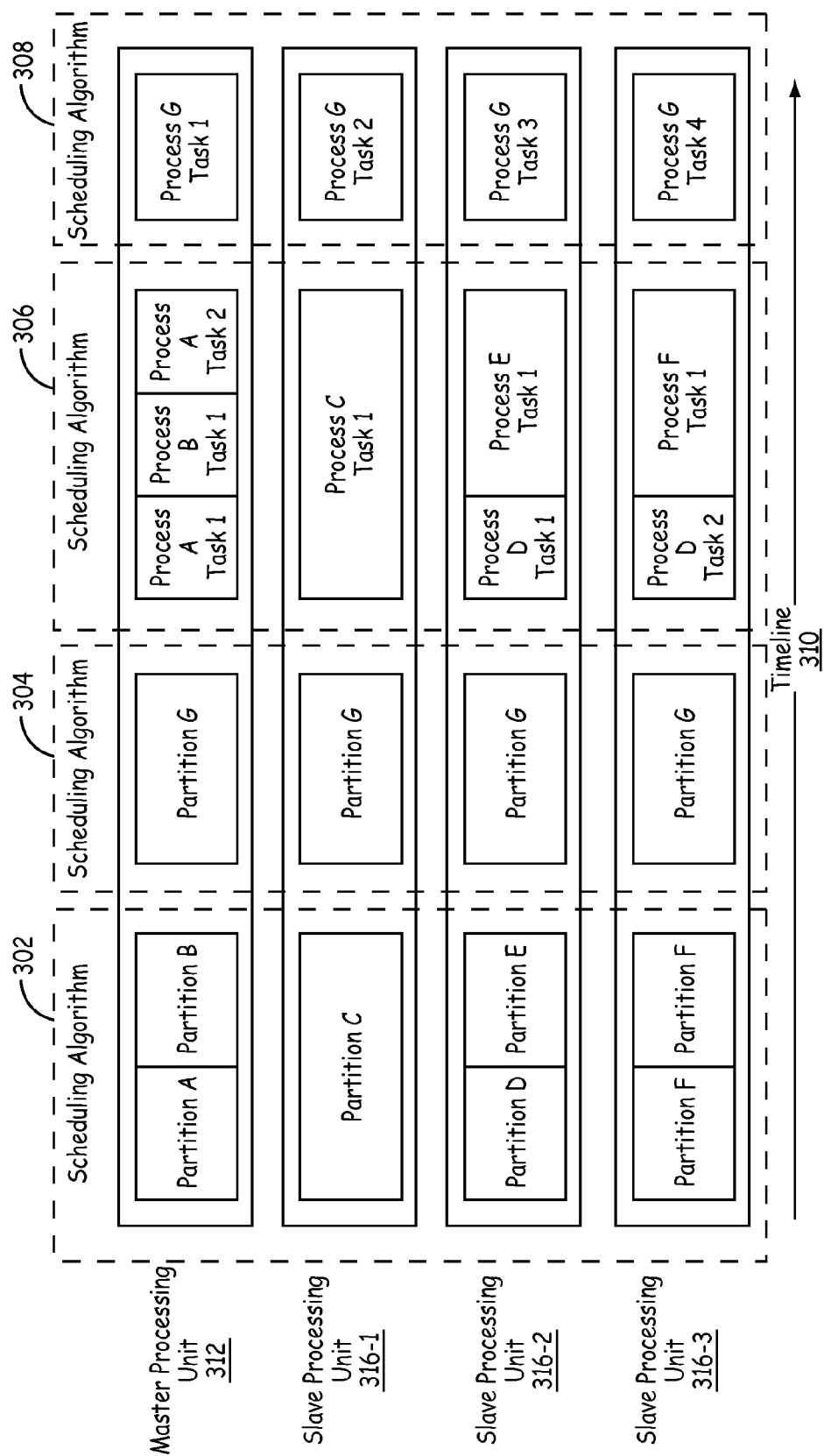
FIG. 3 is a block diagram illustrating the implementation of execution groups with different scheduling algorithms according to one embodiment of the present invention.

FIG. 3 is a block diagram illustrating the implementation of execution groups in different scheduling algorithms. The scheduling of instruction entities organized into execution groups is implementable in multiple scheduling algorithms. For example, scheduling algorithms 302, 304, 306, and 308 use execution groups in the scheduling of partitions and processes. The term "partition," as used herein, refers to a contiguous period of time dedicated to the execution of a set of instruction entity. The term "process," as used herein, refers to an application process that includes a set of instruction entities that execute in support of the application process. Scheduling algorithm 302 implements execution groups in the scheduling of multiple partitions across multiple processing units. For example, a scheduling means (such as 114) schedules partitions A and B on master processing unit 312. Scheduling means 114 then identifies partitions C-F as belonging to the same execution group as partitions A and B and schedules their execution on slave processing units 316-1-316-3. In an alternative implementation, scheduling algorithm 304 implements execution groups in the scheduling of a single partition across multiple processing units. For example, scheduling means 114 schedules partition G on master processing unit 312. The scheduling means 114 then schedules other instruction entities associated with partition G on slave processing units 316-1-316-3.

In another implementation, where scheduling means 114 schedules processes and their associated tasks, in scheduling algorithm 306, scheduling means 114 uses execution groups to schedule multiple processes on multiple processing units. For example, scheduling means 114 schedules processes A and B with their associated tasks on master processing unit 312. Scheduling means 114 then identifies processes C-F and their accompanying tasks as belonging to the same execution group as processes A and B and schedules their execution on slave processing units 316-1-316-3. In a further implementation of process scheduling, in scheduling algorithm 308, scheduling means 114 uses execution groups to schedule the tasks of a single process across multiple processing units. For example, scheduling means 114 schedules process G, task 1 on master processing unit 312. Scheduling means 114 then identifies other tasks in process G as belonging to the same execution group and schedules the other tasks across slave processing units 316-1-316-3. In some implementations, the different scheduling algorithms 302, 304, 306, and 308 are implemented in the same system. For example, in a system, along timeline 310, scheduling means 114 implements scheduling algorithm 302 for a first execution group and then transitions to scheduling algorithm 304 for the next execution group. Likewise, scheduling means 114 implements scheduling algorithms 306 and 308 as time progresses along timeline 310.

Figure 4:
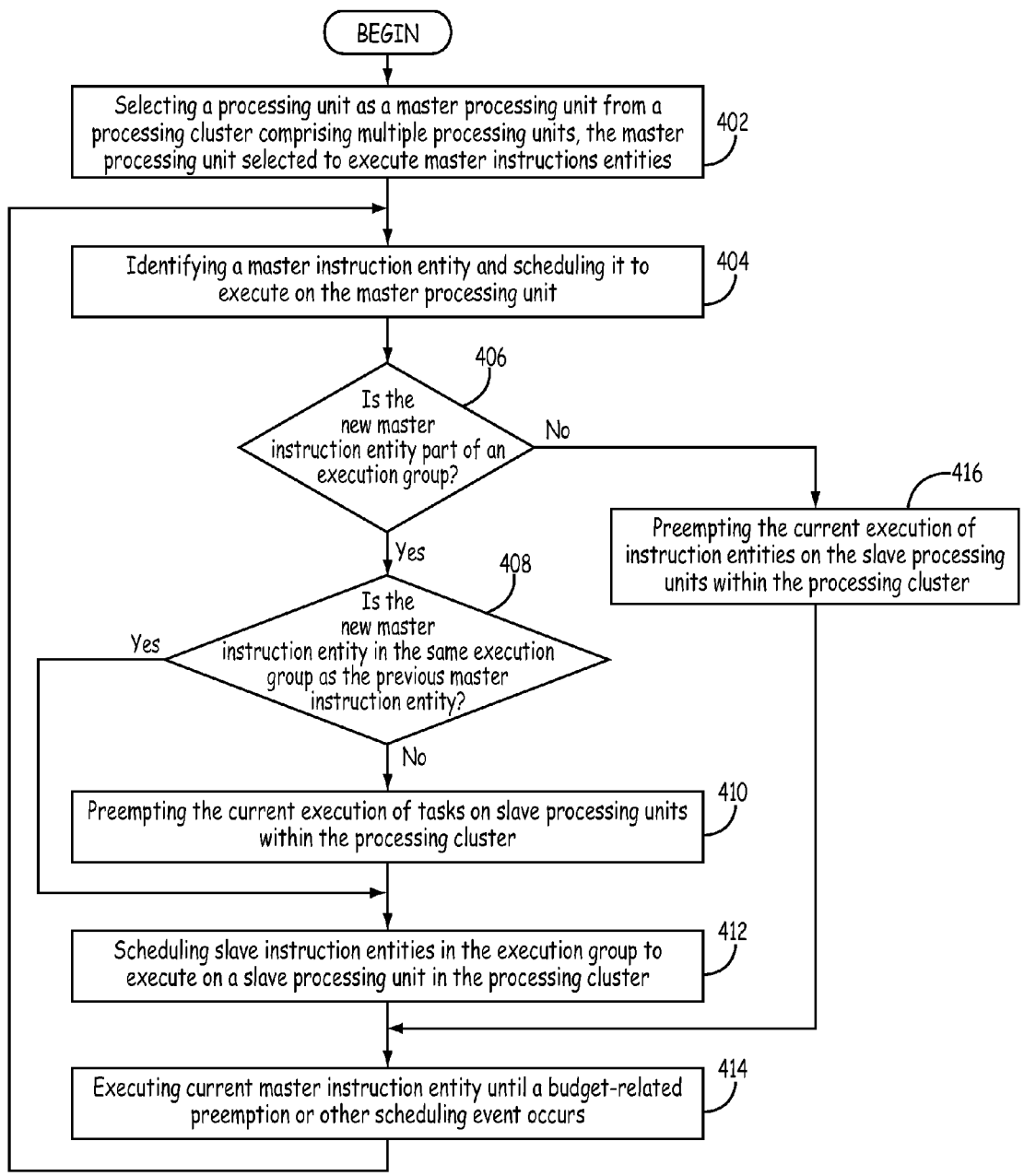
FIG. 4 is a flow diagram of a method of one embodiment of the present invention.

FIG. 4 is a flow diagram illustrating a detailed method 400 for using execution groups to schedule the execution of instruction entities on a processing cluster. Method 400 begins at 402 with selecting a processing unit as a master processing unit from a processing cluster comprising multiple processing units, the master processing unit selected to execute master instruction entities. The method proceeds at 404 with identifying a master instruction entity and scheduling it to execute on the master processing unit. For example, a scheduling means utilized for scheduling the master processing unit reads a master instruction entity from memory and schedules it according to a chosen scheduling algorithm (RMA, ARINC 653, priority preemptive, etc).

The method proceeds at decision 406 where a determination is made as to whether the new master instruction entity is part of an execution group. When it is determined at 406 that the master instruction entity is not part of an execution group, the method proceeds to 416 with preempting the current execution of instruction entities on the slave processing units within the processing cluster. Whereupon, the method 400 proceeds to 414 with executing current master instruction entity until a budget-related preemption or other scheduling event occurs. However, in some implementations, scheduling means associates each master instruction entity with an execution group.

When it is determined at 406 that the master instruction entity is part of an execution group, the method proceeds to decision 408 where a determination is made as to whether the new master instruction entity is in the same execution group as the previous master instruction entity. If the master instruction entity is in the same execution group as the previous master instruction entity, method 400 proceeds to 412 with scheduling slave instruction entities in the execution group to execute on a slave processing unit in the processing cluster. When it is determined at 408 that the master instruction entity is not in the same execution group as the previous master instruction entity, method 400 proceeds to 410 with preempting the current execution of tasks on slave processing units within the processing cluster. The method then proceeds to 412 with scheduling slave instruction entities to execute on the slave processing units. The method then proceeds to 414 with executing current master instruction entity until a budget-related preemption or other scheduling event occurs. Method 400 then returns to 404 to process a new master instruction entity.

Figure 5:
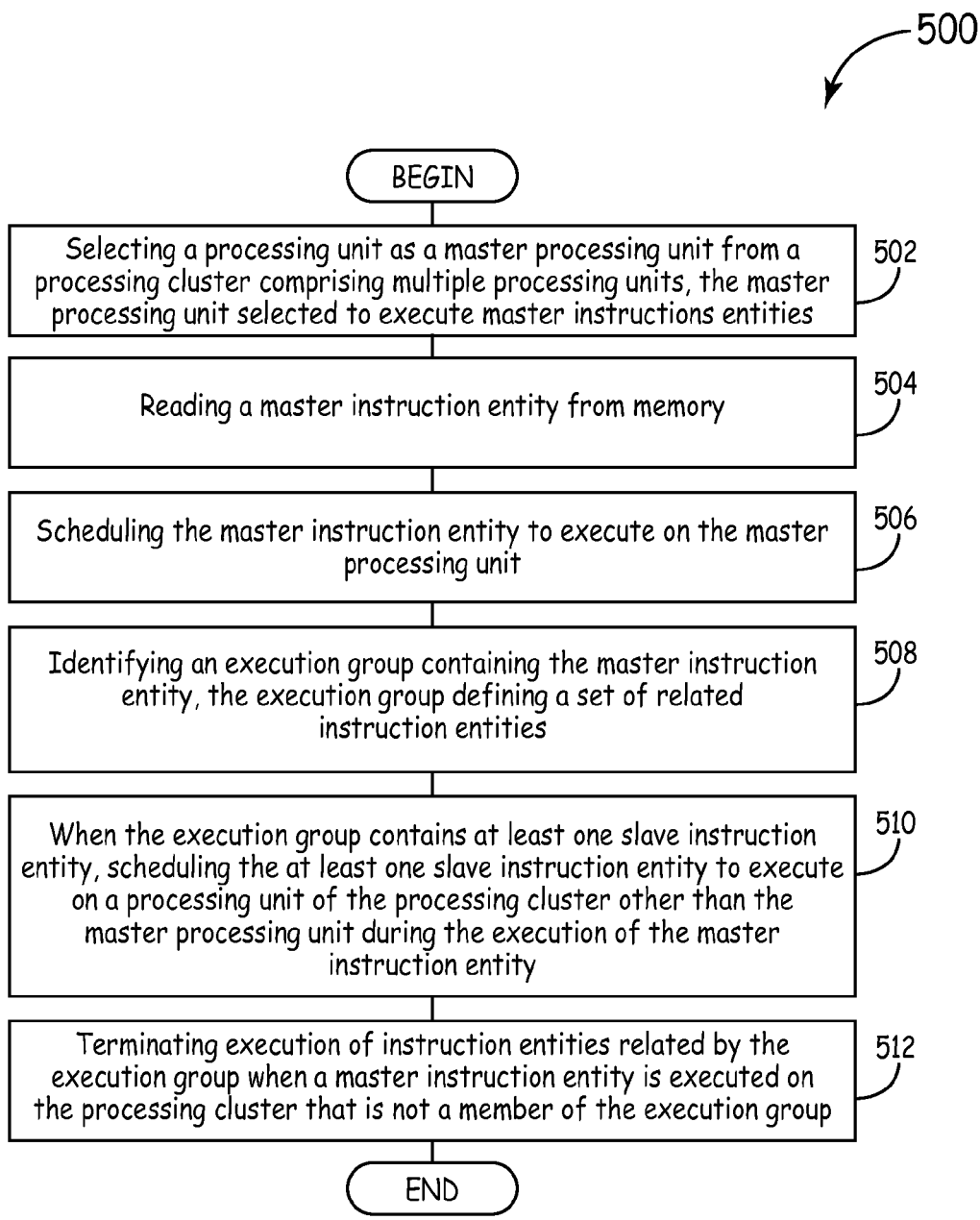
FIG. 5 is a flow diagram of a method of one embodiment of the present invention.

FIG. 5 is a flow diagram illustrating a method 500 for bounding processing times on multiple processing units. In one embodiment, method 500 is executed with respect to the system described in FIG. 1. Method 500 begins at 502 with selecting a processing unit as a master processing unit from a processing cluster comprising multiple processing units, the master processing unit selected to execute master instruction entities. As described above, a processing cluster includes multiple processing units, where a processing unit is either a logical or physical device that executes instructions. For example, a processing cluster includes a set of cores in a multi-core CPU, a set of CPUs in a system of multiple CPUs, a set of hyperthreads on a hyperthreaded CPU and the like. Method 500 proceeds to 504 with reading a master instruction entity from memory, wherein the execution group comprises at least one instruction entity designated as a master instruction entity. Instruction entities stored in memory are arranged into sets of instruction entities called execution groups. When a processing cluster executes instruction entities from an execution group, the interaction of the processing units in the processing cluster is understood such that the worst case execution time of the processes in the execution group is known.

Method 500 proceeds to 506 with scheduling the master instruction entity to execute on the master processing unit. Method 500 proceeds to 508 with identifying an execution group containing the master instruction entity, the execution group defining a set of related instruction entities. The execution group contains at least one master instruction entity and may contain at least one slave instruction entity. When the execution group contains at least one slave instruction entities, method 500 proceed to 510 with scheduling the at least one slave instruction entity to execute on a processing unit of the processing cluster other than the master processing unit during the execution of the master instruction entity. Method 500 proceeds to 512 with terminating execution of instruction entities related by the execution group when a master instruction entity is executed on the processing cluster that is not a member of the execution group. That is, when an execution group includes slave instruction entities, those slave instruction entities are allowed to execute only during the execution of the master instruction entities. By limiting the processing of the instruction entities in an execution group to the time periods defined by the processing budgets of the master instruction entities contained within the group, the processing time of the execution group is bounded on the multiple processing units.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for processing multiple tasks, the system comprising:
   a processing cluster that includes a plurality of processing units;
   at least one memory device coupled to the processing cluster, the at least one memory device storing a plurality of instruction entities;
   a scheduling means configured to schedule a set of one or more instruction entities belonging to an execution group on the processing in a time partitioned execution environment, wherein processing budgets are allotted to specify execution time available during each time period in which an instruction entity in the plurality of instruction entities can execute, the execution group comprising a set of instruction entities from the plurality of instruction entities;
   wherein a first unit of the plurality of processing units is designated by the scheduling means as a master processing unit and at least one of the set of one or more instruction entities is designated as a master instruction entity for execution on the master processing unit, wherein the set of one or more instruction entities is constrained to execute during the execution of the at least one master instruction entity;
   wherein the master processing unit is dedicated to the execution of the at least one master instruction entity;
   wherein when the execution group contains one or more slave instruction entities, the scheduling means schedules execution of said one or more slave instruction entities on at least one slave processing unit of the processing cluster, where the at least one slave processing unit comprises the processing units in the processing cluster other than the master processing unit, wherein the scheduling means allots a processing budget for the one or more slave instruction entities based upon a sum of time allocated to the at least one master instruction entity; and
   wherein the scheduling means terminates execution of the one or more slave instruction entities when a master instruction entity is executed on the processing cluster that is not a member of the execution group.

2. The system of claim 1, wherein the plurality of processing units comprises at least one of:
   a core in a multi-core central processing unit (CPU);
   a CPU in a multiple CPU system; and
   a logical core in a hyper-threaded CPU.

3. The system of claim 1, wherein the scheduling means schedules the execution of the master instruction entity by allotting a processing budget to the execution of the master instruction entity.

4. The system of claim 1, wherein the plurality of instruction entities are each assigned to at least one of the plurality of execution groups, wherein the scheduling means uses a plurality of scheduling algorithms to schedule the execution of instruction entities associated with the plurality of execution groups.

5. The system of claim 4, wherein the plurality of scheduling algorithms comprise at least one of:
   a rate monotonic scheduling algorithm;
   a priority preemptive scheduling algorithm;
   a round robin scheduling algorithm; and
   an ARINC 653 scheduling algorithm.

6. The system of claim 1, wherein membership of execution entities to the execution group is static.

7. The system of claim 1, wherein membership of execution entities to the execution group dynamically determined by the scheduler.

8. The system of claim 1, wherein at least one instruction entity of the execution group is associated with at least one other execution groups.

9. The system of claim 8, wherein the at least one master instruction entity is defined as a slave instruction entity for at least one other execution group.

10. The system of claim 1, wherein the scheduling means assigns an entity to a slave processing unit based on a characteristic of the slave processing unit.

11. A method for processing multiple tasks, the method comprising
- selecting a processing unit as a master processing unit from a processing cluster comprising multiple processing units, the master processing unit dedicated to execute master instruction entities, wherein the multiple processing units execute instruction entities in a time partitioned execution environment, wherein processing budgets are allotted to specify execution time available during each time period in which the instruction entities can execute;
- reading a master instruction entity from memory;
- scheduling the master instruction entity to execute on the master processing unit;
- identifying an execution group containing the master instruction entity, the execution group defining a set of related instruction entities;
- when the execution group contains at least one slave instruction entity, scheduling the at least one slave instruction entity to execute on a slave processing unit of the processing cluster, wherein the slave processing unit is a processing unit in the processing cluster other than the master processing unit, wherein the at least one slave instruction entity is constrained to execute during the execution of the master instruction entity, wherein a processing budget for the at least one slave instruction entity is based upon a sum of time allocated to at least one master instruction entity in the execution group; and
- terminating execution of instruction entities related by the execution group when a master instruction entity is executed on the processing cluster that is not a member of the execution group.

12. The method of claim 11, wherein identifying the execution group comprises using a static definition of instruction entities in execution groups.

13. The method of claim 11, wherein identifying the execution group comprises dynamically determining instruction entities that belong to the execution group.

14. The method of claim 11, further comprising:
- scheduling a second master instruction entity of the execution group.

15. The method of claim 11, further comprising allotting a processing budget for executing the master instruction entity.

16. The method of claim 15, further comprising forcing the master instruction entity to execute on the master execution unit throughout the processing budget.

17. A system comprising:
- a processing cluster, the processing cluster comprising multiple processing units, wherein one processing unit is designated a master processing unit and the balance of the processing units in the multiple processing units are designated slave processing units;
- at least one memory storing a plurality of instruction entities;
  - wherein a first set of instruction entities in the plurality of instruction entities are associated with an execution group;
  - wherein one or more instruction entities associated with the execution group are designated as master instruction entities;
  - wherein the multiple processing units execute the plurality of instruction entities in a time partitioned execution environment, wherein processing budgets are allotted to specify execution time available during each time period in which an instruction entity in the plurality of instruction entities can execute;
- a scheduling means configured to schedule the one or more master instruction entities to execute on the master processing unit, wherein the master processing unit is dedicated to the execution of the master instruction entities;
- wherein when the execution group contains at least one slave instruction entity, the scheduling means schedules the at least one slave instruction entity to execute on a processing unit of the processing cluster other than the master processing unit during the execution of the one or more master instruction entities, wherein the scheduling means allots a processing budget for the at least one slave instruction entity based upon a sum of time allocated to the one or more master processing entities; and
- wherein the scheduling means terminates execution of the first set of instruction entities when a master instruction entity that is not associated with the execution group is executed on the processing cluster.

18. The system of claim 17, wherein the scheduling means schedules the execution of the one or more master instruction entities by allotting a processing budget for execution of the one or more master instruction entities.

* * * * *